United States Patent [19]

Cholakis

[11] Patent Number: 4,512,720
[45] Date of Patent: Apr. 23, 1985

[54] PUMP IMPELLERS AND MANUFACTURE THEREOF BY CO-INJECTION MOLDING

[75] Inventor: Peter N. Cholakis, Hopkinton, Mass.

[73] Assignee: Barry Wright Corporation, Newton Lower Falls, Mass.

[21] Appl. No.: 484,202

[22] Filed: Apr. 12, 1983

[51] Int. Cl.³ .............................................. F01D 5/14
[52] U.S. Cl. .............................................. 416/241 A
[58] Field of Search ......... 416/240 R, 241 A, 229 R, 416/234; 339/275 R; 264/250, 255

[56] References Cited

U.S. PATENT DOCUMENTS

| | | | |
|---|---|---|---|
| 2,882,077 | 4/1959 | Marsh | 416/241 A |
| 3,054,355 | 9/1962 | Neely | 416/240 R |
| 3,256,939 | 6/1966 | Novak | 416/241 A |
| 3,303,791 | 2/1967 | Doble | 416/241 A |
| 3,307,634 | 3/1967 | Bihlmire | 416/241 A |
| 4,293,182 | 10/1981 | Schwartz | 339/275 R |
| 4,362,471 | 12/1982 | Langer et al. | 416/213 R |

*Primary Examiner*—Henry C. Yuen
*Assistant Examiner*—John Kwon
*Attorney, Agent, or Firm*—Schiller & Pandiscio

[57] ABSTRACT

A pump inpeller and a method for its manufacture wherein the impeller is made of two different synthetic plastics using a co-injection molding process. One plastic, used to fabricate a core section of the impeller, is a rigid thermoplastic material. The other plastic, used to fabricate the vanes section, is a thermoplastic elastomer. The latter is injected after the rigid thermoplastic material.

7 Claims, 6 Drawing Figures

PUMP IMPELLERS AND MANUFACTURE THEREOF BY CO-INJECTION MOLDING

BACKGROUND OF THE INVENTION

This invention pertains to improvements in fluid transfer pumps, and more particularly to a new form of pump impeller and the method of manufacturing such devices.

A number of different types of fluid-handling pumps are known. This invention is concerned primarily with those types of pumps that employ rotating impellers, and particularly with those wherein the impeller is provided with elastomeric blades. Typical of such pumps are positive-displacement flexible-vane pumps. Such pumps consist of a pump housing and an impeller in the form of an eccentrically mounted rotor provided with a plurality of resiliently deformable vanes dimensioned to contact the interior wall of the pump housing. The impeller is preloaded in flexure within the pump housing to provide a movable seal between the impeller and the housing, thereby insuring efficient fluid transfer through a "wiper" action: resilient deformation of the vanes by the pump housing results in an eccentrically distributed volume between impeller and housing, and rotation of the impeller provides a positive displacement of the fluid. Inasmuch as the impeller vanes must flex (so as to act as a seal between the impeller and the housing) while the core portion of the impeller must be substantially rigid (so as to provide necessary structural attachment to a shaft), such impellers fabricated from a single material are at best a compromise. Typically, therefore, flexible-vane impellers are fabricated with a metal core, keyed as necessary to engage a shaft, to which are bonded a plurality of elastomeric vanes.

A number of problems arise from the structure of such pump impellers. Thus, for instance, the fabrication of such an impeller requires molding or fitting and otherwise bonding the vanes onto a separately fabricated (generally, cast and machined) metallic core. Typically, the core must be cleaned and treated with bond conditioner prior to the application of the vanes, and the latter, if molded onto the core, require that the temperature be carefully controlled through the curing cycle. Consequently, this manufacturing procedure requires a number of different steps, with an attendant impact on the cost of the item. It will be recognized that failure to properly execute these steps may further result in a poor bond between core and vanes. Additionally, when pumps using such prior art impellers are used to handle corrosive fluids, the metallic core, although in large measure isolated from the fluid by the surrounding elastomeric vanes, is not completely isolated, and consequently some corrosion of the core may occur.

OBJECTS OF THE INVENTION

Accordingly, it is an object of the present invention to provide a pump impeller and a method for its manufacture that requires little or no machining or assembly.

Additionally, it is an object of the present invention to provide a pump impeller exhibiting superior bonding between core and vanes.

Further, it is an object of the present invention to provide a pump impeller having superior environmental resistance.

BRIEF DESCRIPTION OF THE INVENTION

These and other objects are achieved by making the impeller of two different synthetic plastics using a coinjection molding process. One plastic, used to fabricate the core, is a rigid thermoplastic material. The other plastic, used to fabricate the vanes, is a thermoplastic elastomer. The latter is injected after the rigid thermoplastic material. This order of injection is initiated in order to achieve proper bonding of the two materials.

It will be appreciated that the method of the present invention avoids or substantially reduces the complexity of prior manufacturing methods, thereby favorably impacting the cost of impellers thus manufactured. It will also be appreciated that the process of molding the elastomer while the core is still curing provides a bond between core and vane of high reliability without requiring additional steps, such as cleaning and applying bond conditioner to a metallic core, nor does it require tight control of molding temperatures and pressures. It will further be appreciated that, through a proper selection of thermoplastic materials, an improved resistance to corrosion of the core, relative to a metal core, may be achieved.

Other objects of the invention will in part be obvious and will in part appear hereinafter. The invention accordingly comprises the processes involving the several steps and the relation of and order of one or more of such steps with respect to each of the others, and the products possessing the features, properties, and relation of elements which are exemplified in the following detailed disclosure and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

In the various views, like index numbers denote similar elements.

DETAILED DESCRIPTION

Figure 1:
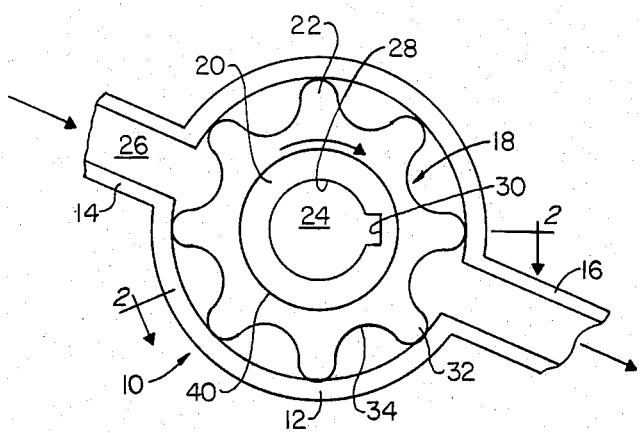
FIG. 1 is a sectional view of a pump incorporating an impeller constituting a preferred embodiment of the invention.

Referring to FIG. 1, there may be seen a pump 10 consisting of housing 12, connected to and in fluid communication with inlet conduit 14 and outlet conduit 16, and impeller 18. Impeller 18, as will hereinafter be described in greater detail, comprises core 20 and vane assembly 22. In operation, impeller 18 is mounted on and driven by shaft 24, so as to provide positive displacement of fluid 26 between inlet conduit 14 and outlet conduit 16, as is well known in the art pertaining to fluid pumps.

In greater detail, impeller 18 is a two-part item consisting of core 20 and vane assembly 22. Core 20 is made of a substantially rigid thermoplastic polymeric material, while vane assembly 22 is made of a thermoplastic elastomer. (As used herein, the term "substantially rigid thermoplastic polymeric material" means a solid substantially rigid material which has the property of fusing [i.e., softening to the point of becoming a liquid] when heated to a suitable temperature and of hardening and becoming solid and substantially rigid again when cooled to room temperature [i.e., 70° F. (20° C.)], and the term "thermoplastic elastomer" means a solid material which has the property of fusing when heated to a suitable temperature and of hardening and becoming a solid which is resilient and behaves as an elastomer when cooled to room temperature.) These thermoplastic materials may consist of a single thermoplastic polymer substance or a mixture of such substances, with or without additives such colorants, plasticizers, anti-oxidants, stabilizers and other functional ingredients that suitably modifiy one or more of the physical properties of the thermoplastic substance. It will be understood that the substantially rigid thermoplastic polymer may, in part, include an elastomer, while, similarly, the elastomer may include polymers which are normally considered to be substantially rigid.

A further requirement of this invention is that core 20 and vane assembly 22 be formed by injection molding. Hence, the substantially rigid thermoplastic material and the thermoplastic elastomer must be materials which are capable of being injection molded. These molding materials may consist of or be made up in the majority of one or more polymers and/or one or more copolymers. Additionally, the materials used to manufacture core 20 and vane assembly 22 should be compatible with one another in the sense that they are capable of directly bonding to one another by fusion (i.e., by contacting the materials when at least one is in a fluid state and then cooling the fluid state material until it has solidified and formed a bond with the other material without the need for adhesives) or chemically (i.e., by cross-linking). Preferably core 20 is formed of a material having a flexural modulus in access of 400,000 psi (28,000 kg cm$^{-2}$) while vane assembly 22 is formed of a soft, low modulus thermoplastic elastomer having a Shore A scale durometer value substantially between 35 and 85. By way of example but not limitation, core 20 is made of polystyrene having a flexural modulus of about 465,000 psi (33,000 kg cm$^{-2}$) and vane assembly 22 is made of butadiene styrene compound having a Shore A durometer value of 55.

Core 20 and vane assembly 22 are shown in the drawings as having sharply defined boundaries since, as explained below in greater detail, the interfaces between these parts are substantially free of any intermixing or interdiffusion of the thermoplastic materials.

Figure 4A:
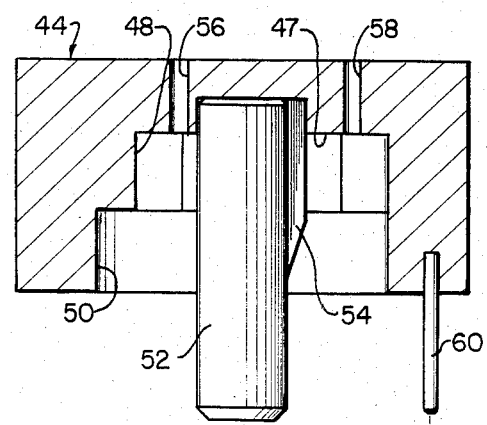
Figure 4B:
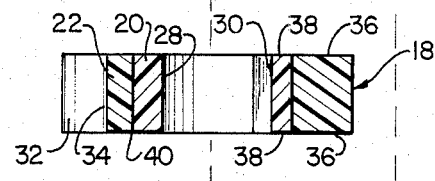

Referring to FIG. 1 and FIG. 4B, it may be seen that core 20 of impeller 18 is preferably of right circular cylindrical form and further provided with a coaxial cylindrical bore 28 and a keyway 30, dimensioned and disposed to securely engage a keyed shaft 20. Vane assembly 22 surrounds and extends from core 20. In a preferred embodiment, vane assembly 22 is substantially of crenated cylindrical form, having peripherally disposed alternating vanes 32 and grooves 34. End faces 36 of vane assembly 22 are preferably substantially coplanar with end faces 38 of core 20.

Vane assembly 22 is bonded to core 20 over a substantially cylindrical surface 40. When impeller 18 is made by the molding method hereinafter described, substantially no diffusion or mixing of one material into or with the other material will occur. Additionally, no or only minor distortions of one material by the other will occur along the boundary regions. It has been determined by inspecting cross sections of bonds made according to this invention that the boundaries between butadiene styrene thermoplastic elastomer (as used for vane assembly 22) and polystyrene (as used for core 22) have an interface region (the region of diffusion or intermixing of one material into or with the other, corresponding to surface 40) associated with a bonding region with a thickness on the order of only $1 \times 10^{-6}$ inch ($2.54 \times 10^{-6}$cm). Nevertheless, the bond between the elastomer and the thermoelastic is sufficiently strong for the device to perform satisfactorily as an impeller.

Figure 2:
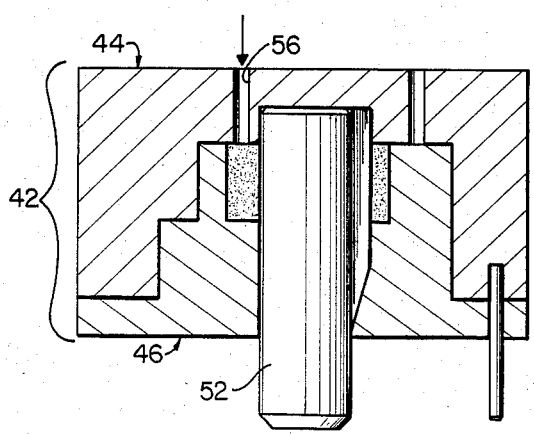
FIGS. 2-4A-C are sectional views, at various stages of the manufacturing process according to the present invention, through a preferred embodiment of an injection mold assembly and an impeller, the section being taken along a line corresponding to the line 2—2 of FIG. 1.
Figure 3:
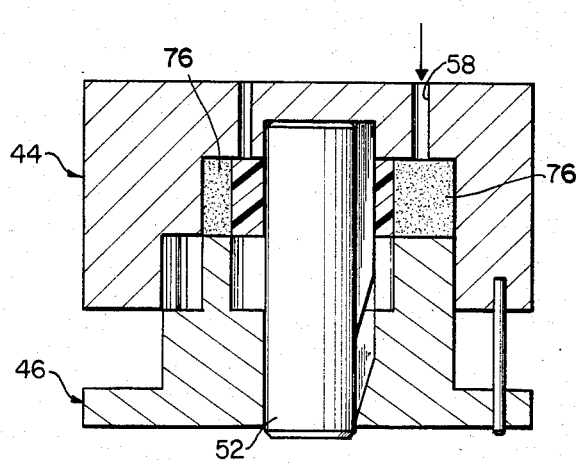

Referring now to FIGS. 2 through 4, impeller 18 of FIG. 1 is produced in accordance with a preferred mode of practicing the invention by means of a coinjection mold assembly 42 that essentially comprises two relatively movable mold members 44 and 46. As may best be seen in FIG. 4A, mold member 44 has a contoured inner surface which comprises three distinct portions 47, 48, and 50, and further includes an attached center post 52. Portion 47 is a substantially planar surface of the same extent and configuration as a combined set of end faces 36 and 38 of impeller 18. Portion 48, arranged substantially normal to portion 47, is configured and dimensioned to correspond to vanes 32 and grooves 34 of vane assembly 22 of the impeller. Portion 50 is a cylinder of similar extent as the outside dimension of impeller 18, and is disposed substantially coaxial to portion 48. Post 52 is a cylindrical post of the same diameter as the inside diameter of bore 28, and is provided with key 54 corresponding to keyway 30. As will be appreciated by those skilled in the art, both post 52 and key 54 may be provided with suitable tapers to facilitate mating with mold member 46. Mold member 44 is further provided with a pair of injection ports 56 and 58 respectively communicating with the interior of the mold through portion 47 inside and outside a radius corresponding to cylindrical surface 40 of impeller 18. Mold member 44 is also preferably provided with one or more pilot pins 60 so as to insue proper alignment of mold assembly 42, as will be understood by those skilled in the art. It will also be understood that mold member 44 may be provided with a suitable ejector means (not shown) to facilitate removing a finished part from the mold.

Figure 4C:
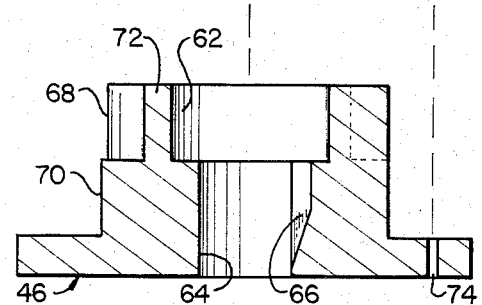

Turning now to FIG. 4C, there may be seen mold member 46. Mold member 46 has an interior portion defining a cylindrical cavity 62 and a through bore 64. Cylindrical cavity 62 is provided with substantially the same dimensions as the outside dimensions of core 20 of impeller 18. Bore 64 is dimensioned to accept post 52 of mold member 44, and is further relieved with slot 66 dimensioned to accept key 54. Mold member 46 is also provided with contoured outer surface 68, configured and dimensioned to make a close sliding fit with inner surface portion 48 of mold member 44, and a cylindrical outer surface 70, dimensioned to make a close sliding fit with inner surface portion 50. Upper surface 72 of mold member 46 is of substantially planar finish. Preferably, mold member 46 is further provided with appropriate apertures 74 disposed and dimensioned to accept pilot pins 60 of mold member 44.

Mold members 44 and 46 are adapted (by conventional means not shown but known to persons skilled in the art of injection molding) to move relative to one another along the axis of post 52, so that, as described hereinafter, the mold members may be positioned relative to one another at selected positions along that axis.

Impeller 18 is manufactured using the mold assembly of FIGS. 2 through 4 according to the following method. First mold members 44 and 46 are placed in the totally closed position shown in FIG. 2 (the first injection position) and a suitable liquid thermoplastic injection molding material capable of solidifying into a rigid or nearly rigid solid (e.g., polystyrene) is injected, via injection port 56, into the cavity defined by cavity 62 of mold portion 46 and portion 47 and post 52 of mold portion 44. In this way, core 20 is formed.

Next, mold portions 44 and 46 are separated until the outer edge of surface portion 48 of mold portion 44 is flush with surface 72 of mold portion 46, thereby forming a second cavity 76, as shown in FIG. 3 (the second injection position). A suitable liquid thermoplastic injection molding material capable of solidifying into solid material with the properties of an elastomer (e.g., butadiene styrene) is injected into cavity 76 via one or more injection ports 58 so as to form vane assembly 22. This injection step is conducted after the material injected into cavity 62 to form core 20 has solidified or become viscous enough so that it will not be displaced or distended by the material injected via port 58, yet is soft enough to bond to the elastomeric material by fusion. Thus, the second injection step is carried out while the material forming core 20 is still hot but after it sets up as a solid. By appropriate choice of molding materials, it is possible for second cavity 76 to be filled within as short a time as one to three seconds after cavity 62 has been filled, thereby achieving a satisfactory bond between the elastomeric and non-elastomeric parts along a thin, non-distended, boundry surface 40.

Finally, after vane assembly 22 has set up as a solid in cavity 76, mold members 44 and 46 for completely separated as shown in FIGS. 4A and 4C, whereupon finished impeller 18 (FIG. 4B) may be removed from the mold and set aside to cool. Thereafter, the mold members may be returned to the position shown in FIG. 2 for the next molding cycle.

In the preferred mode of practicing the invention, core 20 is molded of polystyrene which solidifies so as to have a flexural modulus of about 465,000 psi (33,000 kg cm$^{-2}$) and vane assembly 22 is made of a butadiene styrene copolymer which solidifies so as to have a durometer reading, as measured on the Shore A scale, of between about 35 and 85 (depending upon the flexure desired for the impeller vanes), with the polystyrene preferably being the material sold by Shell under the trade name Shell DP-203 and the butadiene styrene being the material sold by Shell under the trade name KRATON 3000 series thermoplastic rubber. Adequate temperatures and pressures are determined by the characteristics of the material used (e.g., the foregoing polystyrene molding material is injected with a pressure of approximately 5000 psi [350 kg cm$^{-2}$] and temperature of about 390° F. [150° C.] and the foregoing butadiene styrene molding material is injected into cavity 76 at a pressure of approximately 6,000 psi [420 kg cm$^{-2}$] and a temperature of about 390° F. [150° C.]). The latter injection step should occur about one to three seconds after terminating injection of the polystyrene molding compound into cavity 62. The injection materials are maintained at a temperature of about 390° F. (150° C.) during the two injection steps, but the mold is maintained at a temperature of about 100° to 150° F. (40° to 65° C.) during the molding process. The mold is opened and the finished part is removed about one minute after the second injection step is completed. The molded part is then set aside and allowed to cool to room temperature before being packaged. The finished products exhibit a shear bond strength between core 20 and vane assembly 22 of at least 400 to 500 psi (28 to 35 kg cm$^{-2}$) and usually between about 600 and 800 psi (42 and 56 kg cm$^{-2}$), in comparison to the typical bond strength of about 500 psi (35 kg cm$^{-2}$) between the metallic core and elastomeric vane assemblies of conventional metal-elastomer impellers.

It is to be noted that injecting the elastomeric material after the rigid material has been injected is critical. It has been determined that if the elastomer is injected at the same time as or before the rigid material, a satisfactory impeller product cannot be achieved since the elastomer is incapable of withstanding deformation in cavity 76 under the pressures require to inject the rigid plastic material into cavity 62. This is true even if the elastomer has fully cured before the non-elastomeric material is injected. Only if the elastomer injection is delayed until after the rigid plastic material has set up sufficiently to withstand deformation under the pressures required to inject the elastomeric material is it possible to achieve a strong enough bond between the elastomer and thermoplastic part and also have the impeller parts conform exactly to the shape of the two mold cavities.

Impellers manufactured according to the present invention possess a number of advantages over those manufactured according to the prior art. Thus, the present method accomplishes the manufacture of an impeller with fewer steps than the prior art wherein a metallic core is cast, machined, cleaned, and then treated with a bond conditioner before the vane assembly is cast. Further, as hereinbefore indicated, superior bonding between vane assembly and core of the impeller may be achieved by the present invention in comparison to the prior art metallic-elastomer impellers. Consequently, both a less expensive and a more reliable product may be achieved. Then, too, through appropriate choice of materials, impellers made by the present method may be made more resistant to environmental factors.

It will be understood that various modifications can be made to both the process and the product without departing from the teaching of the present invention. Thus, for instance, core 20 need not be cylindrical, and may, for instance, be of polygonal section or may be provided with a knurled periphery to improve bonding between core and vane assembly. Then, too, vanes 32 need not be of crenate form, as shown, but may be in a variety of forms (e.g., paddle, cup-shaped, or the like). Yet again, the configuration of impeller 18 may be provided with tapered, rather than planar, end surfaces 38 and 36.

Then, too, vane assembly 22 may be fabricated from a graded series of elastomers, successively injected into a multistage mold. Yet again, it will be appreciated that core 20 may be made of a material other than polystyrene, e.g., acrylonitrilebutadiene styrene (ABS), polymethyl methacrylate (e.g., Plexiglass), a polypropylene polymer or the like. Likewise, vane assembly 22 may be made of a variety of materials other than butadiene styrene. In this connection, it is to be noted that the term "thermoplastic elastomer" is a term already known to persons skilled in the art, as evidenced by Tobolsky et al., "Polymer Science and Materials", page 277, Wiley-Interscience (1971), and that a variety of such materials exist as disclosed by B. A. Walker, "Handbook of Thermoplastic Elastomers," (1979). Further, as noted hereinbefore, the materials used to fabricate core 20 and vane assembly 22 may be blends of materials (e.g., the thermoplastic polymeric material of core 20 may be a blend of materials containing elastomer). The actual selection of pairs of compatible, fusion or chemical bondable materials will depend on engineering considerations.

Since these an other changes may be made in the practice of the present invention without departing from the scope of the invention as herein disclosed, it is intended that the foregoing be interpreted only as illustrative, and not as limiting.

What is claimed is:

1. A pump impeller comprising:
   a core section of a rigid thermoplastic polymeric material and
   a vane section surrounding and secured to said core section, said vane section comprising a plurality of vanes and being made of a thermoplastic elastomeric material characterized in that said vane section is secured to said core section by direct bonding said rigid thermoplastic polymeric material to said thermoplastic elastomeric material through the fusion of a thin interfacial zone of said elastomeric and polymeric materials formed as a result of coinjection molding and wherein said thin interfacial zone has a thickness on the order of $1 \times 10^{-6}$ inch ($2.5 \times 10^{-6}$ cm), said core section being made of material having a flexural modulus in excess of 400,000 psi (28,000 kg cm$^{-2}$), and said vane section being made of a soft low modulus material having a Shore A scale durometer value between about 35 and about 85.

2. A pump impeller according to claim 1 wherein said vane section is bonded to said core section as a consequence of directly fusing said thermoplastic elastomeric material to said rigid thermoplastic polymeric material.

3. A pump impeller according to claim 1 wherein said vane section is bonded to said core section as a consequence of chemically bonding said thermoplastic elastomeric material to said rigid thermoplastic polymeric material.

4. A pump impeller according to claim 1 wherein said core section is made of polystyrene.

5. A pump impeller according to claim 1 wherein said vane section is made of a copolymer of styrene and butadiene.

6. A pump impeller according to claim 1 wherein said core section is of tubular form.

7. A pump impeller according to claim 1 wherein said vane section is of crenated cylindrical form.

* * * * *